United States Patent Office 3,109,999
Patented Nov. 5, 1963

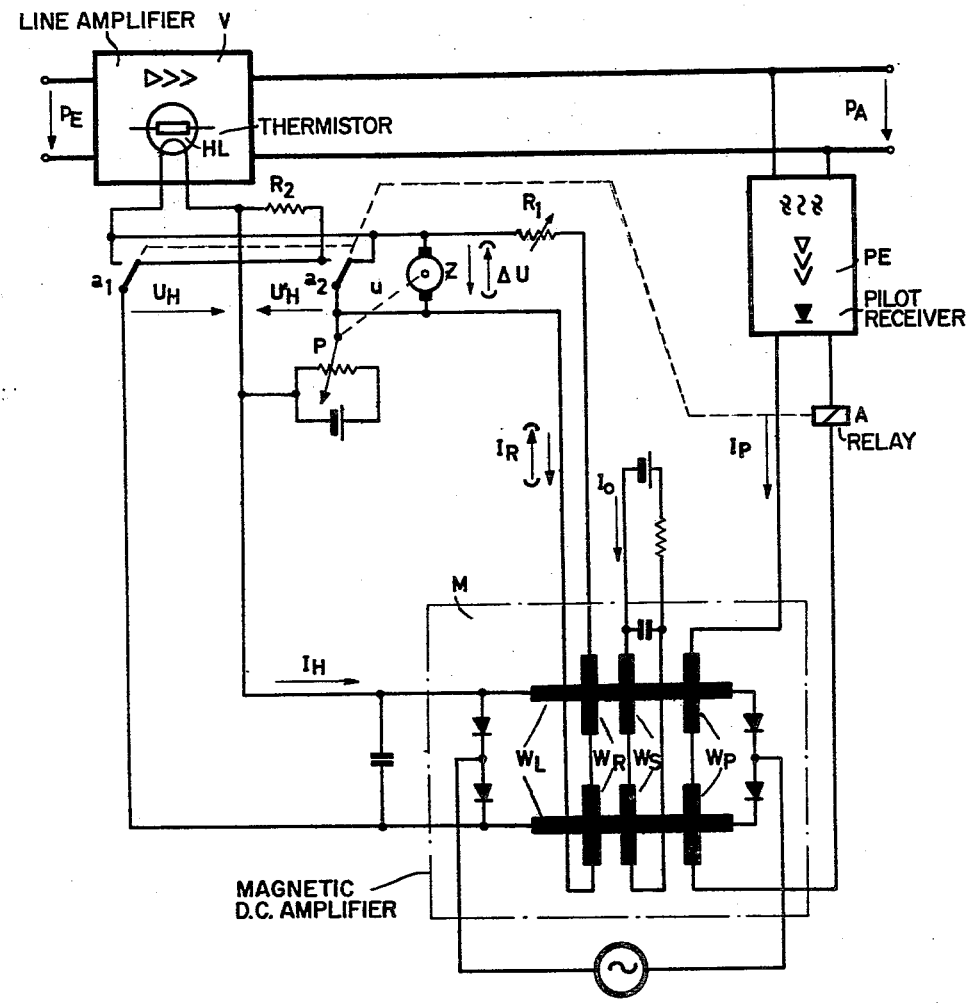

3,109,999
PILOT CONTROLLED VOLTAGE LEVEL REGULATION HAVING SWITCH-OVER, UPON PILOT FAILURE, FROM INSTANTANEOUS TO PAST-INTEGRATED-AND-STORED PILOT CONTROL
Johann-Gerhard Zirwas, Munich, Germany, assignor to Siemens & Halske Aktiengesellschaft Berlin and Munich, a corporation of Germany
Filed Mar. 16, 1960, Ser. No. 15,391
Claims priority, application Germany Mar. 17, 1959
5 Claims. (Cl. 333—16)

This invention relates to pilot controlled voltage level regulation for equalizing or compensating damping alterations along lines of an electrical communication system, particularly a carrier frequency system, wherein the voltage level is regulated by means of a damping member or an amplifier.

There are arrangements known which employ for the above indicated purpose proportionally operating regulators (P-regulators) or integrating regulators (I-regulators). A thermistor serves usually as an adjusting member.

In the case of a P-regulator, there is a proportional relation between the regulation deviation and the adjusted value, that is, between the deviation of the pilot voltage from the desired value and the heating current for the thermistor. The requirement that residual errors, which always occur in such a regulator, shall be small, calls for high regulation amplification. Accordingly, all time constants appearing in the regulation circuit in addition to the thermal time constant of the thermistor, must be kept small so as to obtain satisfactory dynamic regulation, which is equivalent with the requirement for slight "modulation amplification." The term "modulation amplification" refers to an operation in which fluctuations, applying to certain frequencies of the voltage level fluctuations, are amplified by the voltage level regulation; this is above all disturbing when many regulated amplifiers are in a regulation section disposed in chain circuit. There is moreover the drawback in connection with a P-regulator, that the amplification, upon loss of the pilot voltage, cannot be held at the last adjusted value.

An integrating regulator comprises generally a motor which is driven according to the regulation deviation, such motor altering the heating current of the thermistor through the medium of a gear and an adjustable resistor. The motor-gear arrangement necessarily introduces a time constant effecting the regulator which must be, owing to the modulation amplification, sufficiently great as compared with the thermal time constant of the thermistor. This results in a relatively great regulation time constant, so that a section with many such regulators disposed in chain circuit attains, responsive to a sudden voltage level alteration, equilibrium only after the lapse of an undesirably long time interval. Upon loss of the pilot voltage, the condition last adjusted by the regulator can be maintained by stopping the motor.

The object of the invention is to improve the known arrangements, providing particularly: Low amplification modulation, relatively short regulation time, small residual errors in the stationary condition, and maintenance of the adjusted regulation value upon loss of the pilot voltage.

In the pilot controlled regulation according to the invention, the voltage level is regulated by means of a damping member or an amplifier. The arrangement comprises a pilot receiver which receives and rectifies the pilot voltage and a direct current amplifier serially connected with the pilot receiver and operatively affecting an adjusting member. The voltage level regulation according to the invention effects, by means of a motor, regulation of a substitute voltage so that it becomes equal to the output voltage of the direct current amplifier, the motor being supplied by the difference of the two voltages, and a regulation control direct current which is proportional to this voltage difference being additionally conducted to the direct current amplifier.

It is of particular advantage that the substitute voltage can be utilized, upon loss of the pilot, to maintain the adjusted condition.

A difference between the output voltage of the direct current amplifier and the substitute voltage occurs only temporarily during the regulation operation. Since the voltage difference is utilized as a regulation control voltage, the regulation control operates as a relaxation regulation control and the regulator will act as a PI-regulator, thereby considerably improving the stability of the regulation circuit.

The various objects and features of the invention will appear from the description which is rendered below with reference to the accompanying drawing, showing an embodiment of the invention to give an example.

In the illustrated embodiment, a thermistor is used as an adjusting member. The thermistor requires for its operation responsive to the regulation control, a time constant so great that it cannot be satisfactorily realized with the use of purely electrical elements. The use of an electromechanical regulation control by means of motor and gear means permits by the selection of the gear transmission to define the time constant accurately in accordance with the resistance of the thermistor. By adjusting the regulation control current, the regulation time constant can be made as small as possible in view of the permissible modulation amplification and the properties of the thermistor. Moreover, the residual error can be kept small by high regulation amplification, independent of the adjustment of the regulation time constant.

Referring now to the drawing, the regulation circuit comprises a line amplifier V, a pilot receiver PE and the regulator proper, the latter including a direct current amplifier M as well as a motor Z which serves to adjust a potentiometer P through the medium of a gear $u$. In the illustrated example, a magnetic amplifier M is used as a direct current amplifier.

The line amplifier V is disposed in the transmission line of a carrier frequency system; its purpose is to amplify the voltage, which had dropped to the received or input level $p_E$ due to damping in the preceding line section, to the output or transmission level $p_A$. The function of the regulator is to provide in the presence of alterations of the input level $p_E$, within certain limits, a predetermined constant output level $p_A$, for example, by the use of a thermistor HL (adjusting member) disposed in the regulation path of the amplifier V. The pilot oscillation which is also transmitted over the line is for this purpose, in the pilot receiver PE, filtered out, amplified and rectified. The output direct current Ip of the pilot receiver is a criterion for the regulation value, namely, the output level $p_A$ of the line amplifier. The current Ip flows through the supervising relay A and a pair of control windings Wp of the magnetic amplifier M which is also provided with two further pairs of control windings $W_R$ and $W_S$ and a pair of load windings $W_L$. The windings of each pair are similar and are respectively carried by two separate iron cores. The contacts $a_1$ and $a_2$ which are controlled by the relay A are shown in normal position, that is, in the position in which they are when the relay A is deenergized. This condition prevails when the pilot current is absent. Relay A energizes responsive to current Ip flowing by way of windings Wp and places its contacts $a_1$ and $a_2$ in alternate position.

As will be presently shown, in the stationary regulated condition, no current will flow through the windings $W_R$. The windings $W_S$ are traversed by a direct current $Io$ which opposes the current $Ip$ in the windings $W_P$, and determines in the regulation circuit the desired value $Ipo$. The output current $I_H$ of the magnetic amplifier is a function of the deviation $x$ of the current $Ip$ from the desired value $Ipo$. When the amplification of the magnetic amplifier is designated by $\mu$, and assuming proper poling of the control windings $W_P$, there will be obtained (1) $$I_H = I_{HO} - \mu \cdot x$$

So long as the pilot level and therewith the current $Ip$ are above a predetermined minimum value, the relay A will remain energized and its contacts $a_1$ and $a_2$ which are shown in normal position will be in alternate actuated position. Accordingly, the current $I_H$ will flow by way of the actuated contact $a_1$ through the heater of the indirectly heated thermistor HL disposed in the regulation path of the amplifier V. The circuit of the amplifier is such that amplification increases with increasing heating current $I_H$; the poling of the control winding $W_P$ must otherwise be changed, for example, reversed.

So far as described, the operation corresponds to that which takes place in a known proportionally acting regulation circuit (P-regulator). A characteristic feature of such circuit resides in the fact that a certain residual error $\Delta x$ of the regulation value according to Equation 1 must be tolerated for the variation of the heating current $I_H$ in the adjusting range $\Delta I_H$. Such error will be the smaller the higher the amplification $\mu$. However, in the known arrangement, narrow limits are drawn for the amplification owing to the requirements concerning the dynamics of the regulation process.

If the input voltage level $p_E$ exhibits small periodic fluctuations, the output level $p_A$ will exhibit fluctuations of similar frequency. At very low frequency of the fluctuations, their amplitude will be reduced by the regulation. At very high frequencies of the voltage level fluctuations, the regulator will not be able to follow, due to the inertia of the thermistor, and the amplitude fluctuation will be transmitted unchanged. In an intermediate region, there are frequencies at which the regulator will act with respect to amplification with such a delay, owing to the inertia of the thermistor and further time constants in the regulation circuit (especially owing to the indirect heating), that the original fluctuations of the input level will even appear amplified at the output level. This "modulation amplification" must be kept the lower the more similar regulation circuits are connected in a chain.

According to the invention, a substitute regulation voltage $U'_H$ is adjusted by the motor Z so as to correspond to the voltage $U_H$ at the heater of the thermistor. The sensitive motor Z is connected to the voltage difference $\Delta U$ between $U_H$ and $U'_H$. It is operative to adjust the potentiometer P, by way of the gear $u$ so as to make the voltage difference disappear. In the event of loss of the pilot, the relay A will deenergize and place its contacts $a_1$ and $a_2$ in the normal position shown in the drawing, contact $a_2$ thereby shortcircuiting the motor. The potentiometer P will accordingly remain in the last adjusted position. The heater of the thermistor HL is at the same time connected to the substitute regulation voltage $U'_H$, by way of contact $a_2$ in normal position thereof, and the amplification of the line amplifier accordingly will not be further altered. So long as the pilot voltage is present, the substitute regulation voltage $U'_H$ will be loaded with a resistor $R_2$ the resistance of which corresponds to that of the heater of the thermistor.

As has been said before, maintenance of the adjusted regulation value, upon loss of the pilot voltage, would be impossible in the case of a simple P-regulator. It would be possible at best, by means of a relay such as relay A, to switch over to a fixedly adjusted average value of the heating current, which however generally does not correspond to the last adjusted regulation value. This would not secure reliable operation over the line in the event of loss of the pilot.

To the input of the regulation amplifier is connected a regulation control voltage which is proportional to the voltage difference $\Delta U$. The regulator is accordingly being subjected to a relaxation regulation control making it perform as a PI-regulator (proportional-integral regulator) and thus considerably improving the dynamic behavior with respect to the modulation amplification. In the illustrated example, the current $I_R$ flowing through the control windings $W_R$ of the magnetic amplifier M furnishes the regulation control value which is proportional to the voltage difference $\Delta U$ and in the stationary regulated condition equal to zero.

The speed of revolution (r.p.m.) $n$ of the motor is proportional to the voltage $\Delta U$ connected thereto. Accordingly, for the course in time of the voltage difference $\Delta U$ and therewith for the regulation control value, there will be obtained (2) $$\frac{d\Delta U}{dt} = \frac{n}{u} \cdot \Delta U$$

and there will result (3) $$\Delta U(t) = \Delta U(t=0) \cdot e^{\frac{-n}{u}t}$$

The frequency course $F_{r(p)}$ of the regulation control therefor is (4) $$Fr(p) = \alpha \cdot \frac{pT_r}{1+pT_r} \text{---with } p = j\omega$$

The time constant $$T_r = \frac{u}{n}$$

can be varied by proper ratio of the gear $u$. The factor $\alpha$ is determined by the resistor $R_1$.

The improving action of a relaxation regulation control on the dynamic behavior of a regulation circuit is known as such and may be demonstrated approximately as follows: Responsive to a sudden variation of the input voltage level $p_E$ and therewith of the output voltage level $p_A$, there occurs a sudden variation of the current $Ip$. If the magnetic amplifier M produces high amplification $\mu$, there would accordingly result great heating current variation in the absence of the voltage difference $\Delta U$ which counteracts the control action of $Ip$ owing to the feedback control current $I_R$ coinciding with the voltage difference $\Delta U$. The high amplification $\mu$ appears at the instant $t=0$ reduced by the factor $(1+\mu\alpha)$.

(5) $$\Delta I_H(t=0) = \frac{\mu}{1+\mu\alpha} \cdot \Delta Ip(t=0)$$

The alteration of the heating current causes the thermistor to change its resistance temporarily according to an $e$-function with the time constant $T_H$ which is for electrical structural elements relatively great. The current $Ip$ then approaches its desired value according to the same time function. However, the regulation control current $I_R$ is according to Equation 3 simultaneously again reduced to zero by the action of the motor. If the time constant $T_r$ of the regulation control is made equal to the thermal time constant $T_H$ of the thermistor, it will be possible, by suitable selection of a value $\alpha_0$ for the factor $\alpha$, to obtain a condition in which the heating current $I_H$ does not change in the further course of the regulation. The regulation then proceeds according to the operation of the thermistor and according to an $e$-function with the time constant $T_H$ of the thermistor. For smaller or greater values of $\alpha$, there is initially effected respectively an excessive or an insufficient current adjustment which is subsequently corrected during the regulation operation.

The time constant of the regulation operation will then be (6) $$T = \frac{\alpha_0}{\alpha} \cdot T_H$$

It is possible to adjust the time constant of the regulation and therewith also of the modulation amplification by the factor $\alpha$, as the thermistor employed permits, while the regulation amplification $\mu$ may be made as high as required by the residual error independently of such adjustment of the time constant.

An indirectly heated thermistor is used in the illustrated example as an adjustment member. It is, however, also possible to employ a directly heated thermistor or another suitable current dependent or voltage dependent resistor. In place of the potentiometer which serves for the adjustment of the substitute regulation voltage, there may be employed an adjusting transformer with a serially connected rectifier, driven by a motor.

Changes may be made within the scope and spirit of the appended claims which define what is believed to be new and desired to have protected by Letters Patent.

I claim:

1. In a carrier frequency communication system having a sectionally extending communication line for transmitting signal voltages and a pilot frequency, regulator apparatus cooperatively associated with a line section for compensating voltage level alterations appearing at the input of such section due to damping effects occurring in a preceding line section, said regulator apparatus comprising an amplifier having an input for receiving from the preceding line section signal voltages and said pilot frequency, adjusting means having a voltage responsive member for controlling the gain of said amplifier, a device connected to the output of said amplifier for receiving and for rectifying said pilot frequency, a direct current amplifier and circuit means for connecting it with said device for receiving the rectified current therefrom and for producing at its output a direct regulation voltage means connecting said direct regulation voltage to said adjusting means for controlling the operation of said adjusting means, a source for producing a substitute regulation voltage for the control of said adjusting means, motor means for regulating said substitute regulation voltage to adjust the magnitude thereof to that of said direct regulation voltage, means for producing a further voltage corresponding to the difference between said direct regulation voltage and said substitute regulation voltage, means for supplying said difference voltage to said motor to control the operation thereof, means for additionally conducting to said direct current amplifier a regulation control direct current which is proportional to said difference voltage, a relay for supervising the presence of said pilot frequency, and means controlled by said relay responsive to loss of said pilot frequency for disconnecting said adjusting means from said direct regulation voltage while connecting it to said substitute regulation voltage and for simultaneously stopping said motor.

2. A structure and cooperation of parts according to claim 1, comprising a resistor having a resistance equal to that of the voltage responsive resistance member of said adjusting means, and circuit means effective in the presence of said pilot frequency for connecting said resistor as a load in the circuit of said substitute regulation voltage.

3. A structure and cooperation of parts according to claim 1, comprising a magnetic amplifier constituting said direct current amplifier and having a plurality of electrically separated control windings.

4. A structure and cooperation of parts according to claim 1, comprising a magnetic amplifier constituting said direct current amplifier and having a plurality of electrically separated control windings including a winding traversed by current which opposes the rectified current derived from said pilot frequency and delivered by said device.

5. A structure and cooperation of parts according to claim 1, comprising a magnetic amplifier constituting said direct current amplifier and having a plurality of electrically separated control windings including a first winding traversed by the rectified current derived from said pilot frequency and delivered by said device, a second winding traversed by current which opposes said rectified current, a third winding controlled by said difference voltage, and a fourth winding for producing said direct regulation voltage.

References Cited in the file of this patent

UNITED STATES PATENTS 2,881,396  Schraivogel _____ Apr. 7, 1959

FOREIGN PATENTS 579,144  Great Britain _____ July 24, 1946